Oct. 18, 1966    P. HUBMANN    3,279,686
FILTERING CENTRIFUGE

Filed Feb. 27, 1963    2 Sheets-Sheet 1

INVENTOR.
Paul Hubmann
BY
Wenderoth, Lind & Ponack
ATTORNEYS

Oct. 18, 1966   P. HUBMANN   3,279,686
FILTERING CENTRIFUGE
Filed Feb. 27, 1963   2 Sheets-Sheet 2
FIG. 3
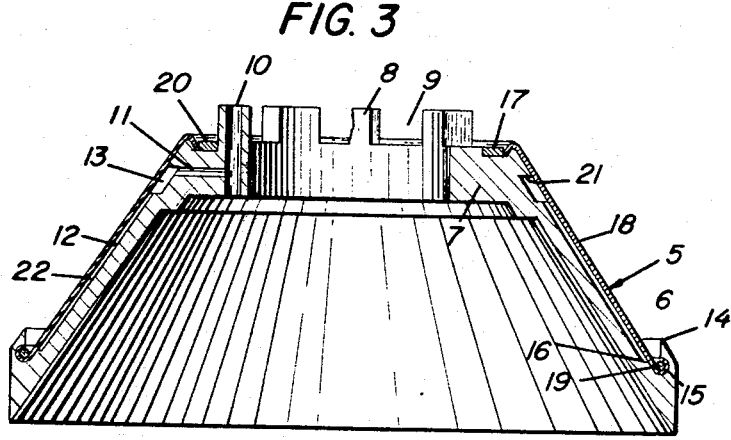
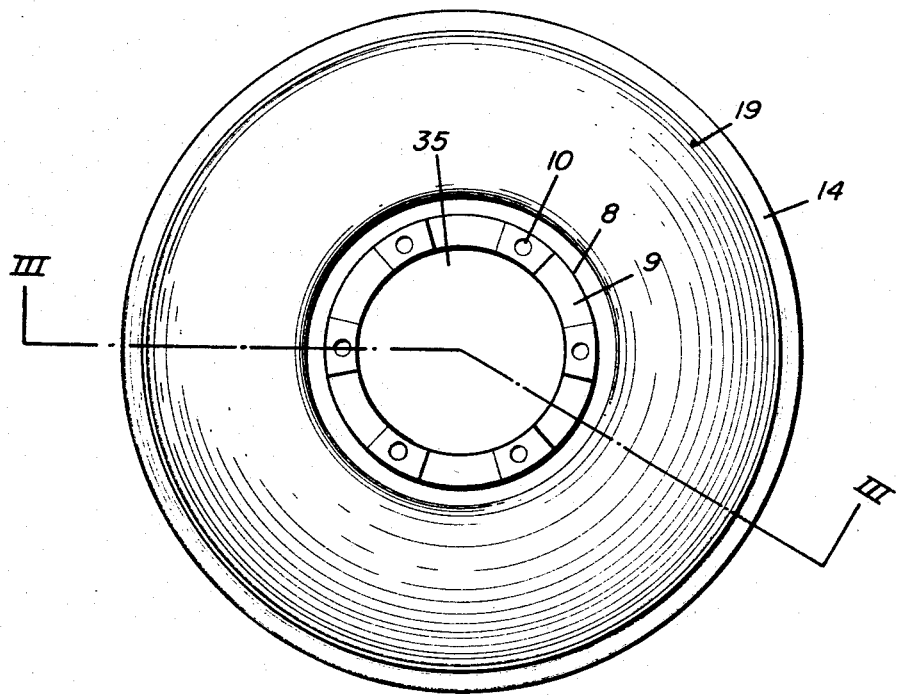
FIG. 2
INVENTOR.
Paul Hubmann
BY
Wenderoth, Lind & Ponack
ATTORNEYS 3,279,686
FILTERING CENTRIFUGE
Paul Hubmann, Zug, Switzerland, assignor to Maschinenfabrik Cham A.G., Zug, Switzerland
Filed Feb. 27, 1963, Ser. No. 261,410
Claims priority, application Switzerland, Mar. 1, 1962, 2,536/62
7 Claims. (Cl. 233—2)

Filtering centrifuges have been proposed in which a cylindrical filter insert is coaxially built into a filter drum and is traversed from the outside towards the inside by the liquid to be filtered. When the sludge which gradually deposits on the filter insert, increases to a certain thickness it will be loosened and whirled away, so that the filter insert becomes clean again. In this type of filtering centrifuge construction the available filtering surface is limited, and therefore such a centrifuge is subjected to the drawback of providing only a relatively low output.

Other centrifuges are known, which are equipped with cone-shaped insert members. In this construction the liquid to be filtered as subdivided into a plurality of layers and the conical filtering members form a large precipitating surface.

It is an object of the present invention to provide a filtering centrifuge having a plurality of conical filter supports superposed in axially spaced relationship in the drum of the centrifuge. A filter pad extends along the outer or upper surface of each filter support and a passage is formed between said outer surface and the filter pad, said passage communicating with the inlet of the fluid to be filtered in the filter drum through the filter pad and communicating directly with the outlet of the filtrate from the drum.

The present invention will now be described in more detail with reference to the accompanying drawings diagrammatically illustrating, by way of example, a preferred embodiment of the invention, and in which:

FIG. 2 is a top plan view of a filter element, and

FIG. 3 is an axial section of the filter element along the line III—III of FIGURE 2.

Figure 1:
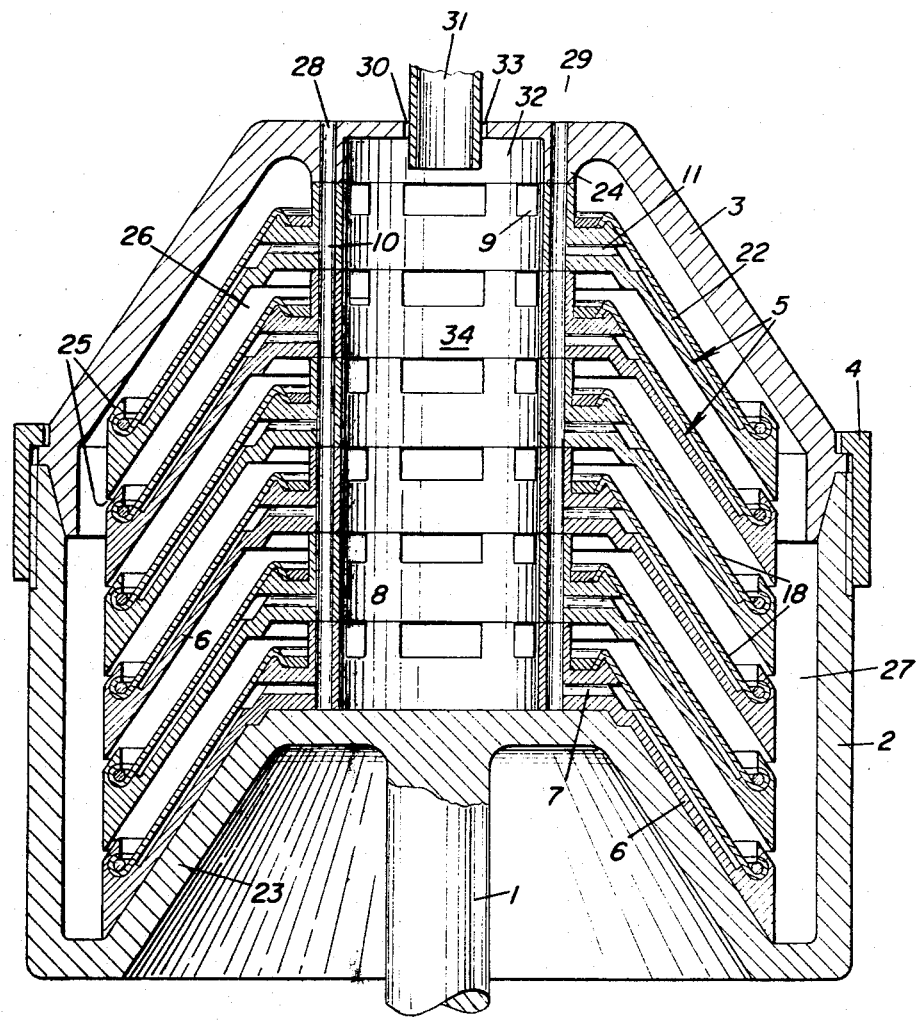
FIG. 1 is an axial section through the drum of the centrifuge.

According to FIGURE 1 a rotary driving shaft 1 carries a pot-shaped centrifuge drum 2. The drum 2 is provided with a conical cover member 3 which is mounted in fluid-tight contact on the top edge of the drum and is secured thereon by an annular nut 4. A pile of conical filter supports 5 is arranged in the closed drum and coaxially with this latter.

The particular construction of the filter supports is evident from FIGURES 2 and 3. Each support 5 comprises a solid, liquid impervious cone-shaped shell 6, having upper and lower surfaces, which extends downwardly and outwardly from a hub plate 7. This hub plate is provided with an annular extension 8 in the form of a rib having perforations 9, directed upwardly at the side of the hub plate 7, remote from the shell 6. Continuous axial ducts 10 are arranged in the extension 8 and communicate with the space 22 outside of the shell 6 by means of radial bores 11. The bores 11 open into an annular circumferential groove 13 provided in the outside face 12 of the shell 6. The lower edge of the shell 6 is provided with a rim 14 which projects from the outside of the shell and forms a groove 15. The outside surface of the shell 6 is formed with a shoulder 16. A further groove 17 is provided at the top side of the hub plate 7. The lower and upper edges of a cone-shaped filter pad 18 engage the groove 15 and the groove 17 respectively, wherein they are retained by means of clamping rings 19 and 20, respectively. Owing to the shoulder 16 and a further shoulder 21 on the outside 12 adjacent to the annular groove 13, a circumferential gap 22 is formed between the outer side 12 of the support 6, and the filter pad 18.

As it is shown in FIGURE 1, the lowermost shell 6 rests with the hub plate 7 or with the inside of the shell upon the conical bottom 23 of the drum 2, while the remaining supports are supported with their hub plates, each upon the top of the extension 8 of the next lower hub plates. An annular rib 24 provided at the inside of the cover 3 finally abuts against the end face of the extension 8 of the uppermost support 5, so that the pile of supports 5 is snugly compressed. The arrangement is made so that an annular gap 25 is formed between each two adjacent supports, or between the uppermost support and the cover 3, which annular gap 25 connects the cone-shaped annular space 26 provided between each pair of supports or between the top support and the cover 3, with a cylindrical annular space 27, surrounding the pile of supports. The individual ducts 10 of the supports form jointly with each other or with the corresponding axial bores 28 of the cover 3 an axial conduit designated as a whole by 29, which communicates by the radial bores 11 with the spaces 22 provided between the outside surface of the shell 6 and the filter pad 18.

An inlet tube 31 extends through an opening 30 in the cover 3 into the chamber 32 enclosed by the annular rib 24 of the cover. The diameter of the bore 30 is somewhat larger than the outside diameter of the inlet tube 31, so that the latter is surrounded by an annular gap 33. This annular gap serves as overflow for the central cylindrical chamber 34 which is formed by the chamber 32 and by the central bores 35 (see particularly FIGURE 2) of each hub plate 7 of the elements 5.

The liquid to be filtered supplied through the inlet tube 31 into central chamber 34, passes through the recesses 9 of the extensions 8 of the filter supports 6 into the intermediate spaces 26 and after traversing the filter pad 18 finally flows through the horizontal bores 11 into the conduits 29. The filtered liquid may then be discharged from the filter unit. In the shown construction of the filter unit there will be no whirling motion of the liquid in the sludge room 27. The impurities entrained in the liquid are retained by the filter pads 18. It is readily apparent from the description and the drawings, that an extraordinarily large filtering surface is available in the described arrangement. As soon as the layer of impurities retained on the outside of the filter pads 18 reaches a predetermined thickness, this layer is disintegrated due to centrifugal force and the impurities are projected against the inside of the next higher shell 6. They will move outwardly along the shell surface and then finally pass through the gap 25 into the sludge room 27, where they are permitted to precipitate. The pressure which is required to force the liquid through the filtering centrifuge is obtained by suitably selecting the radial spacing of the discharge conduits 29 or of the outlet edge thereof and the overflow edge of the gap 33.

In the preceding description a filtering centrifuge has been exposed in which the filter supports together with the filter pads offer an extremely large filtering surface, whereby a self-cleaning of the filter pads is obtained without requiring any whirling motion of the liquid within the sludge chamber.

A screen insert may be arranged in the annular gap between the outer surface 12 of a shell 6, and the associated filter pad 18, said insert, of course, being formed in such a manner that the flow of the liquid along the outer surface 12 in the direction towards the annular groove 13 is neither impeded nor interrupted.

The preceding description shall not be considered as limited to details in the supply of the liquid to be filtered, in the discharge of the filtered liquid, and in the treatment of the liquid eventually issuing through the overflow, since the particular provisions are different in each case, but at any rate well known to the person skilled in the art.

I claim:

1. A self-cleaning filtering centrifuge, including: a rotatable drum having a lateral wall; a cover for said drum, having an inlet for the fluid to be filtered and an outlet for the filtrate; a plurality of supports, each defining liquid impervious upper and lower upwardly converging conical surfaces and an axis, said supports superposed in vertical, axially spaced relationship within the drum for rotation therewith, wherein there exists between successive concave surfaces a space that is open to the lateral wall of the drum; a conical filter means associated with each of said supports; means forming a part of each of said supports for supporting the associated filter means in spaced relationship to the upper conical surface of the support and the lower conical surface of the next higher support, whereby to form a flow passage between said filter means and the upper conical surface of the associated support, said passage communicating with said inlet through said filter means and directly with said outlet.

2. The centrifuge of claim 1, including a central, annular hub for each of said supports, said hub defining a lateral wall for supporting the next higher support in said spaced relationship; a central chamber defined by the plurality of hubs, into which said inlet opens; at least one opening in said lateral wall for permitting communication between said central chamber and the space defined between said filtering means and the lower conical surface of the next higher support.

3. The centrifuge of claim 1, wherein said inlet is an opening in said cover, and a feed line projecting through said opening into said central chamber, there being provided a clearance between said line and the wall of said opening, whereby to form an overflow.

4. The centrifuge of claim 2, including a plurality of passages parallel to said axis in the lateral wall of each of said hubs, the passages of each hub being in alignment with corresponding ones of the other hubs; a plurality of passages in said cover in communication with said plurality of passages of the hub of the topmost one of said supports; and a plurality of radial passages in the lateral wall of each of said hubs communicating with said plurality of passages and with said flow passage of the respective support.

5. The centrifuge of claim 1, wherein each of said supports terminates in a rim separated from said hub by said upper and lower conical surfaces, and wherein said means for supporting the filter means is located in part on said hub and in part on said rim.

6. The centrifuge of claim 1, wherein each of said supports terminates in a rim separated from said hub by said upper and lower conical surfaces, each rim being spaced from that of the next higher support and the rim of the topmost support being spaced from said cover.

7. The centrifuge of claim 6, wherein said rims are spaced from said drum to form a sludge collecting chamber between said drum and said rims.

References Cited by the Examiner

UNITED STATES PATENTS

| | | | |
|---|---|---|---|
| 1,269,067 | 6/1918 | Enel | 233—2 |
| 1,721,230 | 7/1929 | Molbach | 233—29 |

M. CARY NELSON, *Primary Examiner.*

H. KLINKSIEK, *Assistant Examiner.*